United States Patent [19]

Carter

[11] Patent Number: 4,644,261

[45] Date of Patent: Feb. 17, 1987

[54] METHOD OF DETERMINING CYLINDRICITY AND SQUARENESS

[76] Inventor: Donald L. Carter, 2316 Donna Dr., Vestal, N.Y. 13850

[21] Appl. No.: 706,878

[22] Filed: Feb. 28, 1985

[51] Int. Cl.[4] .......................................... G01R 27/26
[52] U.S. Cl. ................................................ 324/61 R
[58] Field of Search .......................... 324/61 R, 61 P; 340/870.37

[56] References Cited

U.S. PATENT DOCUMENTS

| | | | |
|---|---|---|---|
| 3,263,167 | 7/1966 | Foster et al. | 324/61 R |
| 3,386,031 | 5/1968 | Able et al. | 324/61 R |
| 3,488,581 | 1/1970 | Foster | 324/61 R |
| 3,502,969 | 3/1970 | Courtney-Pratt et al. | 324/61 R |

FOREIGN PATENT DOCUMENTS

| | | | |
|---|---|---|---|
| 1249290 | 9/1967 | Fed. Rep. of Germany | 324/61 R |
| 2100441 | 12/1982 | United Kingdom | 324/61 R |
| 0640197 | 12/1978 | U.S.S.R. | 324/61 R |
| 0667800 | 6/1979 | U.S.S.R. | 324/61 R |

*Primary Examiner*—Stanley T. Krawczewicz
*Attorney, Agent, or Firm*—Kenneth P. Johnson

[57] ABSTRACT

Method of determining cylindricity and squareness of mating shaft and bearing members by rotating one member with respect to the other stationary member while using a fluid film as a stiff supporting lubricant to establish a stable and dynamic reference axis, and placing a sensing transducer in the stationary member to measure the variation in distance between the transducer and surface of the rotating member at predetermined increments of rotation and to measure the deviation in squareness in a thrust bearing arrangement. The rotating member is axially translated relative to the transducer and cylindricity measurements made at regular intervals during each of a plurality of revolutions during the axial translation to precisely map the variations in distance to the surface of the rotating member. Squareness measurements are also made under dynamic thrust loading to establish deviations from a true right cylinder.

8 Claims, 3 Drawing Figures

METHOD OF DETERMINING CYLINDRICITY AND SQUARENESS

FIELD OF INVENTION

This invention relates generally to a method of measuring the deviation from a true right circular cylinder of a rotatable, apparently cylindrical, surface and, more particularly, to a method of accurately determining that deviation for the cylindrical and end surface while the surface is dynamically supported on a stiff fluid film during rotation.

BACKGROUND OF THE INVENTION

The demand for high quality journal bearings with improved dimensional precision, such as needed for greater recording track densities of magnetic disks or hostile environments, requires that cylindricity of mating surfaces be held within narrower tolerances in the range of a few microinches. Gas bearings, particularly the self-acting type, are well-suited for such applications, but the dimensional and geometric precision of production components is difficult to achieve since the surfaces cannot be reliably characterized.

In order to improve the positional accuracy, enable starting and stopping without use of a jacking gas, and increase the rotational velocities, the mating bearing surfaces must be known to be formed with a high degree of precision, exhibiting little, if any, eccentricity, and the bearing elements must certainly be capable of inspection as to these required tolerances. Although the extreme accuracy has been necessary, there has not been available a reliable technique for precisely measuring variations from true cylindricity of either a rotating shaft or its bearing under dynamic conditions and throughout the entire mating surfaces. Finishes and run-out tolerances can easily be specified but there is needed a technique to assure the dimensional quality of journal elements and their associated bearing surfaces.

Various gaging arrangements for measuring bearing deviations from cylindricity have been proposed. One of the more reliable techniques has been to use non-contact capacitive gaging. Present day systems can measure in the microinch range and provide direct read-out of sensed distances. A prior system that has been used to measure ovality of a hollow cylinder, detects capacitance changes at diametrically opposite points as a probe is slowly moved internally along a pipe, as is shown in U.S. Pat. No. 3,867,691. A similar arrangement is shown in U.S. Pat. No. 4,295,092 where a probe detects changes in capacitance due to dimensional changes in a corroded pipe wall. Another method has been to measure internal dimensions of a mold by using a probe having multiple capacitors, as in U.S. Pat. No. 4,352,060. In this instance, the probe carrying the capacitors is moved along a guide rail and each capacitor senses the immediately adjacent wall distance as the probe progresses.

In the known art, there is no method disclosed for determining with precision the variation in distance between the surface of a rotating member relative to that of a stationary member along a plurality of planes and under dynamic conditions. The prior art further neglects establishment of a true functional center from which measurements can be referenced. Measurements of diameters or radii have been merely approximations, even with a highly sensitive capacitive instrument, because the probes are not steadily supported on, nor positioned about an accurate and reliable axis. Nor have the known techniques been able to provide high resolution mapping of the entire surface of interest in an efficient and inexpensive manner. The prior art is further devoid of teachings to determine to the same accuracy the squareness of end surfaces of an apparent right circular cylinder under dynamic thrust loading.

Objects and Summary of the Invention

It is accordingly a primary object of this invention to provide a method of determining variations in cylindricity or squareness of a rotating member under dynamic conditions, while remaining relatively insensitive to temperature changes.

Another important object of this invention is to provide a method of determining the variation in cylindricity or squareness of a bearing member rotating relative to its mating bearing member on a fluid film by using a single probe to sense in accurate detail in microinch range the dimensional and geometric characteristics of the moving surface.

A further object of this invention is to provide a rapid method of measuring the cylindricity of a member that is rotating on its stable functional axis to thereby obtain more nearly absolute measurement of its radii.

Yet another object of this invention is to provide a method of mapping deviations of the surface of a rotating member from true cylindricity to a high degree of areal resolution by measuring a plurality of radii in each of a plurality of circumferential bands along the axis of rotation.

A still further object of this invention is to provide a method of improved reliability for measuring the variations in cylindricity of either a shaft or journal and its bearing surface as one of the members rotates relative to the other on a stiff self-acting gas film lubricant and about its functional center.

The foregoing objects are attained in accordance with the invention by rotating a bearing member relative to a stationary mating bearing member with a fluid film serving to separate and stiffly support the rotating member on its functional center, mounting measuring transducer means in the stationary member adjacent to the rotating member for providing an indication of the momentary distance to the moving surface from a fixed point, and periodically sensing the signals from the transducer means to obtain those distance values. Measurements can also be taken at different circumferential bands by axially translating one member relative to the other to thereby obtain variations in the radial dimension over a substantial portion, if not all, of the adjacent surface of the rotating member.

With the foregoing technique, the rotated member determines a stable center of rotation that is dynamically established from which the variations in radial dimensions can be obtained. The rotated member, which can be supported on a self-acting gas film, can be driven through a flexible coupling that allows the member to seek its dynamic and stable rotational center. Encoder means can readily be attached to time the sensing with respect to rotational displacement and enable detailed mapping of the rotated bearing surface for high areal resolution of surface characteristics. The relative velocity of the surfaces can be selected to produce the maximum fluid film stiffness and maintain necessary stability. The invention has ready adaptability to the determination of squareness measurements at the ends of cylinders in thrust bearing applications. The transducer signals lend themselves to automated computer processing.

The foregoing and other objects, features and advantages will become apparent from the following more particular description of a preferred embodiment of the invention with reference to the accompanying drawing.

DESCRIPTION OF A PREFERRED EMBODIMENT

Figure 1:
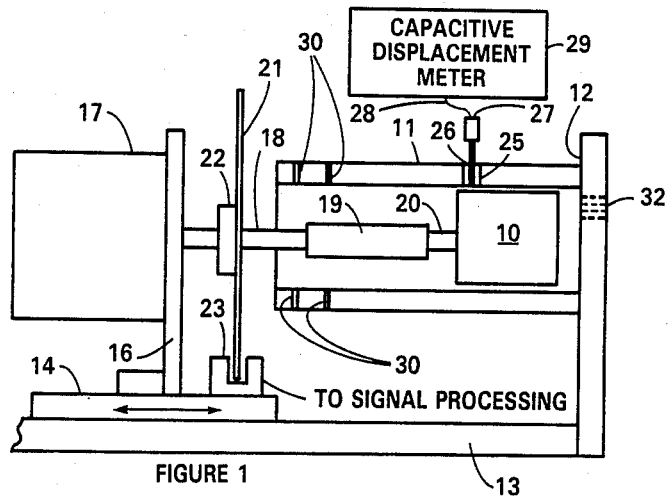
FIG. 1 is an elevation view, partially in section, of apparatus for relatively rotating a mating shaft and bearing sleeve to enable accurate determination of the cylindricity of the rotated member in accordance with the principles of the invention.

Referring to FIG. 1, a shaft 10 as one member of a precision gas journal bearing is rotatable within a fixed mating bearing 11 as the other member of the gas bearing. Bearing or sleeve 11 is affixed at one end to plate 12 that is, in turn, mounted on base 13. Base 13 supports slide plate 14 that is moveable bidirectionally, as indicated by the arrows, on ways, not shown. Affixed to slide 14 by suitable means is bracket 16 supporting an adjustable speed electric motor 17 whose shaft 18 is secured through flexible coupling 19 to stub shaft 20 that is fixedly secured to bearing shaft 10. With this arrangement, motor 17 is able to rotate bearing shaft 10 at variable velocity within stationary bearing sleeve 11 to simulate journal operation. Because slide plate 14, ultimately supporting motor 17, is bidirectionally movable, shaft 10 can be translated axially within bearing 11 during rotation of the shaft. Motor shaft 18 also carries an encoder disk 21 thereon secured via hub 22 to the shaft. The encoder disk may be of the type having one band of alternating transparent and opaque marks representing increments of displacement of motor shaft 18, and a second band with a single transparent mark to indicate a 'home' position. The marks can be sensed by assembly 23 comprising light sources and optical sensing transducers that produce displacement and 'home' signals during bearing rotation.

Bearing 11 is formed with opening 25 in its wall in which insulative bushing 26 is retained. Within the bushing a highly sensitive transducer probe 27 is mounted for sensing the variation in distance between the probe end and rotating surface of shaft 10. Probe 27, in this embodiment, is that of a capacitive displacement sensing instrument, such as a Van Reijsen-Boersma Capacitive Displacement Meter CVM VI. Capacitive gaging provides a stable linear system that permits accuracy, high resolution and opportunity for self-calibration. The probe is connected via cable 28 to the capacitive displacement meter 29 that converts the capacitance to an analog voltage. Other suitable types of probes, such as a contact type, can also be used for sensing the changing distance between the probe end and the capacitive shaft surface. A contact probe requires slower speed and more measurement time and is better suited to bearings using liquid lubricants.

Bearing 11, in FIG. 1, is also provided with a plurality of ports 30 in the sleeve wall near the left end. These ports are each connected through a manifold to a source (not shown) of pressurized gas that is supplied for use as temporary jacking gas during start-up of the bearing. The gas may be any suitable type, such as pressurized air. When rotation of the bearing is initiated, slide plate 14, carrying motor 17, disk 21 and its optical sensing assembly 23, flexible coupling 19 and bearing shaft 10, is in a retracted position toward the left so that shaft 10 is aligned with ports 30 through which the supporting gas is forced. Upon reaching the desired velocity the jacking gas is shut off and slide 14 is moved toward the right so that the surface of bearing shaft 10 rotates beneath probe 27.

The bearing members used as specimens, that is, shaft 10 and mating sleeve 11, are typically of electrically conductive metal and are contemplated as being precision elements apparently cylindrical, made by techniques that provide the high quality necessary for operation in gas bearings. Therefore, shaft 10 can be started within the jacking region of bearing 11 and then changed to a self-acting gas bearing by its movement to a position where the jacking gas is ineffective or absent. Bearing operation with a self-acting fluid film provides a substantial, reliable stiffness that establishes a stable rotational axis from which radial dimensions can be accurately measured during operation. The selected rotational velocity is one that will produce a stable rotational center and results in a measurement sampling rate within the capability of the particular instrumentation used. The minimum speed at which a stable rotational center can be maintained is readily determined by reducing the speed of shaft 10 while under probe 27 and noting the speed at which a signal variation occurs. Lubricant film stiffness above this minimum speed is constant with further increases in speed. The type of lubricant used and amount of heat generated affect the stable operating speed.

In operation, bearing 11 is mounted as a master on support plate 12, while its mating shaft 10 is secured to flexible coupling 19 on motor shaft 18, and slide plate 14 is fully retracted leftward. Thereafter, slide plate 14 is positioned so that specimen shaft 10 is within the region of jacking gas issuing from from ports 30. Motor 17 is then started and as shaft 10 rotates within bearing 11, the flexible coupling allows the shaft to seek its stable rotational axis. Flexible coupling 19 may be any of several suitable commercial types, such as rubber, convoluted or magnetic types. After shaft 10 has reached its desired rotational velocity, at which the required lubricant stiffness is achieved with the gas film, slide plate 14 is moved toward the right until the end of shaft 10 rotates within bearing sleeve 11 beneath the sensing end of probe 27. The jacking gas can be terminated and the probe activated for supplying output signals.

Output signals from capacitive displacement meter 29 represent the distance from the probe end to the surface of shaft 10 and are fed via cable 31 for digital processing and storage or display on a cathode ray oscilloscope. The probe output signal is combined with angular displacement and "home" signals from assembly 23 that periodically gate the probe output and provide a plurality of sensed values at predetermined increments of rotation of the bearing shaft. At the conclusion of one or more revolutions of the shaft, (for verification or averaging) the output of probe 27 can be blocked and shaft 10 moved to a new position by incrementally advancing slide 14 to the right either automatically or manually. Probe signal sensing is then resumed for a second band of surface on the shaft. This technique permits the entire surface of shaft 10 to be "mapped" as the shaft rotates about a stable functional center that closely simulates operating conditions. Digital processing of the recorded probe signals can provide mean diameter dimensions and statistical parameters such as maximum, minimum and variance of the dimensions. The selection of increment size of either the displacement disk marks or the slide advancement provides wide latitude in the frequency of measurement of a specimen surface. When measurements have been concluded, slide 10 is retracted to its start-up position and stopped in the presence of jacking gas at orifices 30. A new specimen shaft can be installed and its surface scanned. This disclosed system thus enables the measurement of a plurality of shafts in an efficient and thorough manner.

Figure 2:
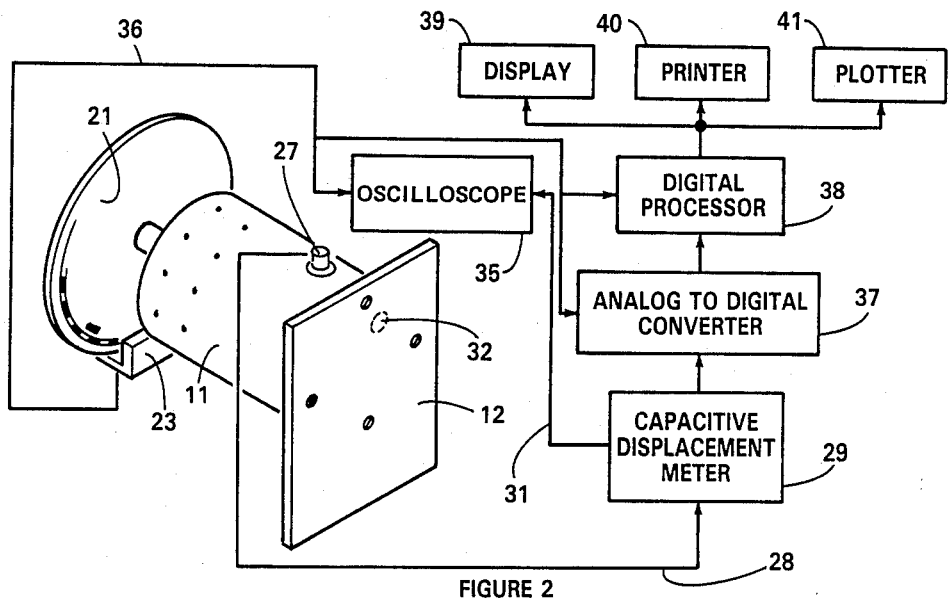
FIG. 2 is a schematic diagram of a data processing system that can be used for collecting, arranging, viewing and storing data obtained during the operation of the apparatus shown in FIG. 1.

A system for handling the output data signals from probe 27 and capacitive displacement meter 29 is shown in FIG. 2. The probe and meter in a typical capacitive instrument, such as the Van Reijsen-Boersma mentioned above, converts the sensed values to an analog voltage signal. The voltage represents the varying capacitance sensed by the probe and can be transmitted through cable 31 to an oscilloscope 35. The oscilloscope is also connected to cable 36 from sensing assembly 23 so that the "home" signal initiates a display trace. For data processing, the analog signal issuing from meter 29 can be digitized by analog-to-digital converter 37 and the converted signals applied to digital processor 38. The rotary displacement and "home" signals on cable 36 are supplied to digital processor 38 to identify the signal values with each rotary increment. Output signals from processor 38 can be stored and ultimately supplied to either a display unit 39, printer 40 or plotter 41. When the bearing shaft is being moved incrementally by slide 14 (FIG. 1) to different circumferential bands, any known transducing arrangement can be attached to the slide to identify by appropriate output signal the attainment of each axial increment of motion. These signals are then transmitted to the digital processor.

Figure 3:
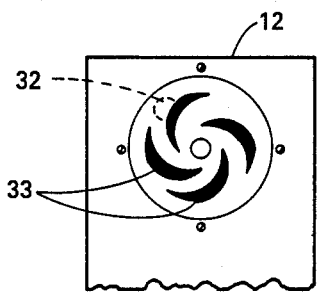
FIG. 3 is a diagram of a grooved thrust plate for use with the apparatus of FIG. 1 when determining squareness of a bearing end surface in a thrust bearing application.

It should be noted that the measurement method of the invention can be modified in various ways. For example, bearing sleeve 11 can be made the rotating member in some instances while shaft 10 serves as a master and is held stationary. Shaft 10, in that instance, can be equipped with jacking gas ports 31, be attached to plate 12, and be fitted with a sensing probe 27 (FIG. 1). This arrangement permits examination and measurement of the interior surface of bearing 11 under dynamic conditions. It will also be noted that the disclosed process can be readily sdapted to the inspection of thrust bearings for squareness deviation of the end surface. This is done by mounting the probe in opening 32 (shown in phantom) in plate 12 within the internal diameter of the stationary member 11 (FIG. 1) in a simulated thrust loading embodiment, such as the end cup for a shaft having axial loading. Plate 12 would have a suitable thrust bearing configuration, such as pumping grooves 33, shown in FIG. 3 Different thrust loads can be easily applied during operation through a compression spring or other arrangement from the flexible coupling.

Although the invention has been described as relatively rotating the bearing shaft and sleeve with a gas as the lubricating film, any suitable liquid can also be used. The bearing being examined is preferably operated in an environment simulating the intended ultimate installation as closely as possible. Liquid lubricants have a greater stiffness and the rotated member will achieve a stable, dynamic center of rotation at a lower speed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The method of determining cylindricity of a conductive rotating member comprising the steps of:
   rotating said member at a desired velocity relative to a conductive mating bearing element with said member supported on a stable axis of rotation by a fluid film between said member and said element;
   mounting transducer means in said bearing element adjacent to the surface of said member for issuing a signal representing the distance between said transducer means and said surface as it moves; and
   sensing said transducer signal at successive increments of rotary displacement of said member to determine the magnitude of said distance at various positions of said member.

2. The method as described in claim 1 wherein said transducer means includes probe means for issuing a varying signal representative of the capacitive charge between said probe means and the surface of said member due to changing distance therebetween.

3. The method as described in claim 1 wherein said fluid film is a gas film established by the relative motion of said member and said element.

4. The method as described in claim 3 further including the step of initiating said relative motion by supplying supplimentary jacking fluid as a lubricating aid in reaching said desired velocity.

5. The method as described in claim 1 further including the steps of axially translating said member relative to said element during said rotation and sensing said transducer signal a plurality of times at each of different circumferential bands about said member during said translation.

6. The method as described in claim 1 wherein said member is stationary and said element is rotated relative thereto and said transducer means is mounted in said member.

7. The method as described in claim 1 wherein said transducer means is located in said element so as to issue a signal indicative of the variation in distance to the surface of said member from a plane perpendicular to the rotational axis of said member.

8. The method as described in claim 1 wherein said transducer means is arranged to measure said distance as it varies under an axial thrust loading of said member during said rotation.

* * * * *